(12) United States Patent
Inakura

(10) Patent No.: US 7,812,851 B2
(45) Date of Patent: Oct. 12, 2010

(54) IMAGE PROCESSING APPARATUS

(75) Inventor: Keita Inakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 11/124,061

(22) Filed: May 6, 2005

(65) Prior Publication Data

US 2005/0253867 A1 Nov. 17, 2005

(30) Foreign Application Priority Data

May 13, 2004 (JP) ............................. 2004-143810

(51) Int. Cl.
*G09G 5/00* (2006.01)
(52) U.S. Cl. .................................... 345/629
(58) Field of Classification Search ................. 345/629, 345/619; 382/254, 274
See application file for complete search history.

(56) References Cited

U.S. PATENT DOCUMENTS

| | | | |
|---|---|---|---|
| 6,184,895 B1 * | 2/2001 | Boezeman et al. .......... | 345/589 |
| 6,882,350 B2 * | 4/2005 | Asami ......................... | 345/638 |
| 6,956,576 B1 * | 10/2005 | Deering et al. .............. | 345/475 |
| 7,075,556 B1 * | 7/2006 | Meier et al. ................. | 345/629 |
| 7,158,151 B2 * | 1/2007 | Asami ......................... | 345/629 |
| 7,342,581 B2 * | 3/2008 | Vinberg ....................... | 345/440 |
| 2002/0097250 A1 * | 7/2002 | Fukushima et al. ......... | 345/629 |
| 2003/0080975 A1 * | 5/2003 | Kuroki et al. ............... | 345/629 |
| 2006/0170707 A1 * | 8/2006 | Kokemohr ................... | 345/629 |

FOREIGN PATENT DOCUMENTS

JP 2001-28063 A 1/2001
JP 2003-153080 A 5/2003

* cited by examiner

*Primary Examiner*—Ryan R Yang
(74) *Attorney, Agent, or Firm*—Canon USA Inc IP Division

(57) ABSTRACT

An image processing apparatus includes a first display control unit for generating first image data to be displayed on a first image layer, a second display control unit for generating second image data to be displayed on a second image layer, a display update unit for controlling the second display control unit in accordance with a display position of the first image data to be displayed on the first image layer and extended information on the type for processing the first image data, and a combining unit for combining the first image data output from the first display control unit and the second image data output from the second display control unit so as to generate display image data.

6 Claims, 7 Drawing Sheets

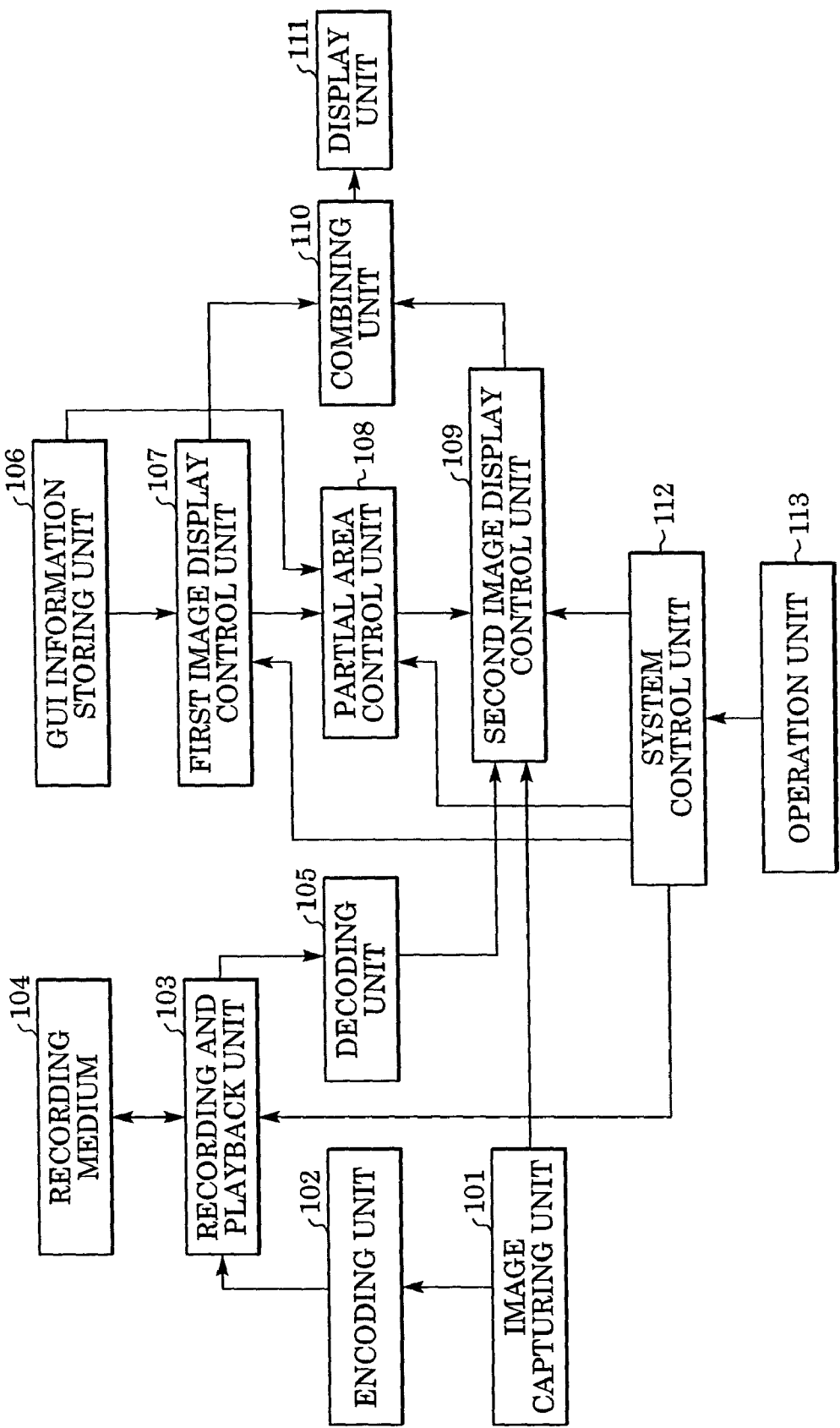

IMAGE PROCESSING APPARATUS

BACKGROUND OF THE INVENTION

1. Field of the Invention

The present invention relates to an image processing apparatus and, in particular, to a process for combining a plurality of image layers to display a combined image.

2. Description of the Related Art

Video input and output apparatuses using a graphical user interface (GUI) have been known. Such apparatuses have a first image layer that displays a GUI and a second image layer that displays video pictures. Users can intuitively carry out image processing on the second image layer by operating the apparatus while viewing the display of the combined first and second image layers (for example, while viewing the GUI on the first image layer).

On the other hand, users generally have a requirement for changing a partial image of the displayed image by a user operation. For example, Japanese Patent Laid-Open No. 2001-28063 discloses a technology in which a user transforms a partial image in a predetermined target image area by operating an external switch.

However, in the technology in which a user executes an operation to transform a partial image in a predetermined target area on a second image layer, which is the target image to be processed, in Japanese Patent Laid-Open No. 2001-28063, if a GUI and the second image layer, which is a target image to be processed, are combined and a user operates the GUI in place of a switch, the display of the second image layer cannot be changed in response to a change in the display of the GUI, which is a problem.

For example, when a user processes a partial image on the second image layer by operating a GUI, the consistency between a processed position and shape of the image on the second image layer and the position and shape of the GUI on the first image layer must be maintained. Accordingly, when changing the position and shape of a graphic element of the GUI, a predetermined area of an image to be processed requires re-setting. However, it is difficult to determine the precise position and shape of the graphic element of the GUI displayed on the first image layer from the second image layer, where a background image is displayed. Also, in the case of apparatuses for recording and playing back a moving image, it is difficult to set the area of an image to be processed, since the image displayed on the second image layer is always changing.

SUMMARY OF THE INVENTION

Accordingly, the present invention provides an imaging apparatus capable of maintaining the consistency even when a displayed image changes in a simple manner.

According to an aspect of the present invention, an image processing apparatus includes first display control means for generating first image data to be displayed on a first image layer, second display control means for generating second image data to be displayed on a second image layer, display update means for controlling the second display control means in accordance with a display position of the first image data to be displayed on the first image layer and extended information relative to a processing type for the first image data, and combining means for combining the first image data output from the first display control means and the second image data output from the second display control means so as to generate display image data.

Further features and advantages of the present invention will become apparent from the following description of exemplary embodiments with reference to the attached drawings.

BRIEF DESCRIPTION OF THE DRAWINGS

FIG. 1 is a block diagram of an imaging apparatus according to the present invention.

DESCRIPTION OF THE EMBODIMENTS

Embodiments of the present invention will now be described with reference to the accompanying drawings.

First Embodiment

Figure 2A:
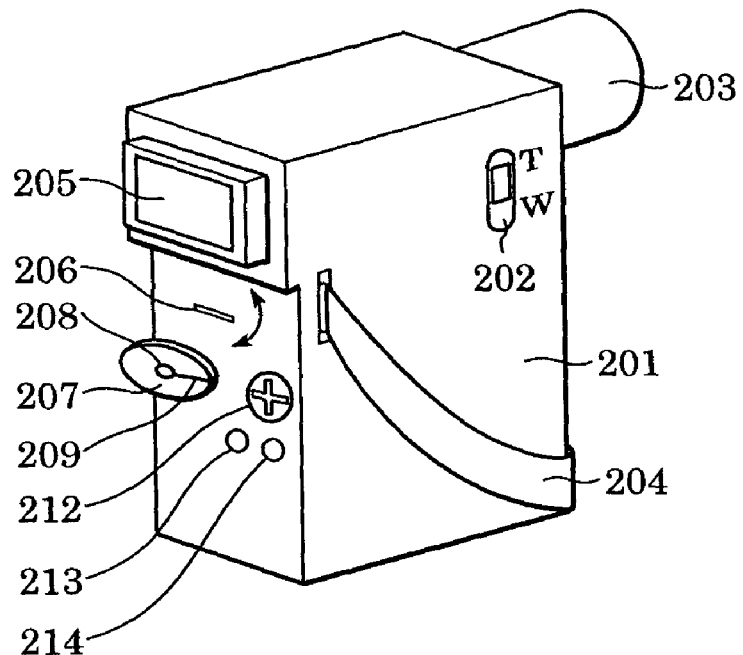
FIG. 2 (FIGS. 2A and 2B) is an external view of an imaging apparatus according to the present invention.
Figure 2B:
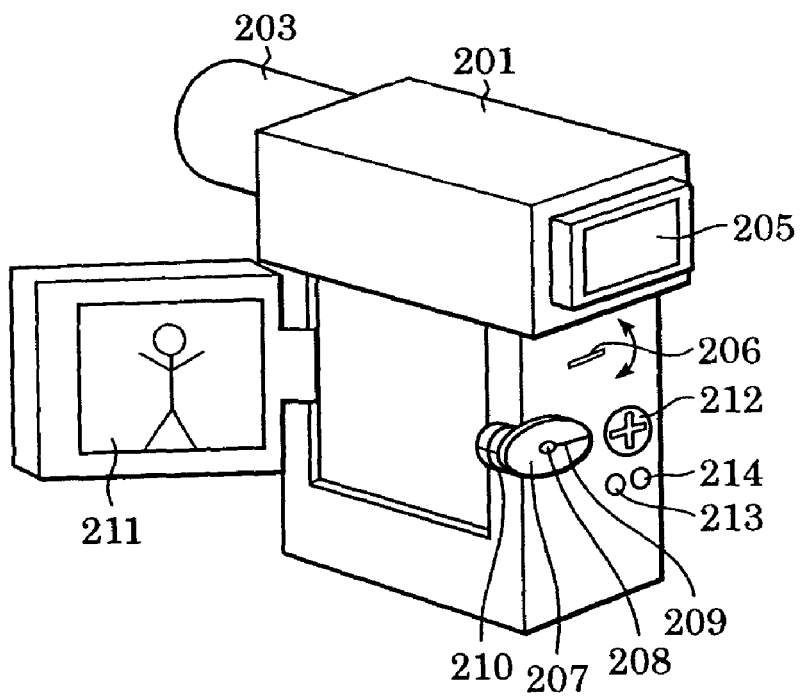

A first embodiment of the present invention is described below. FIG. 2A is an external view of an imaging apparatus including display control means according to the first embodiment. That is, FIG. 2A is a perspective view of the imaging apparatus viewed from a grip used for holding the imaging apparatus. FIG. 2B is another external view of the imaging apparatus. That is, FIG. 2B is a perspective view of the imaging apparatus viewed from an LCD (liquid crystal display) unit attached to the side of the imaging apparatus.

As shown in FIGS. 2A and 2B, the imaging apparatus includes a body 201, a zoom switch 202, a lens unit 203, and a wrist strap 204. By moving the zoom switch 202 to a "W" position and to a "T" position, wide-angle shooting and telescope shooting are provided, respectively. The wrist strap 204 is designed to press against the back of the user's hand by a belt to hold the imaging apparatus.

The imaging apparatus also includes a viewfinder 205, which includes a small LCD and a magnifying lens. A photographer can monitor a shot image by bringing the eye close to the viewfinder 205.

The imaging apparatus also includes a mode dial 207, which includes an operation switch used for changing an operation mode. As shown in FIGS. 2A and 2B, by rotating a stick portion extending to the right, one of the following six modes can be selected: a power-off mode, a VTR mode, a CAMERA mode, a PHOTO mode, a PROGRESSIV SCAN (progressive scan) mode, and an edit mode. The PHOTO mode is a mode for recording a still image on a recording medium.

Setting the mode dial 207 to the PROGRESSIV SCAN mode can change from a regular camera (moving image) mode, in which two lines are read out of an image sensor at a time, to a mode in which one line is read out. Thus, each frame of a moving image can be recorded with high image quality.

Accordingly, the PROGRESSIV SCAN mode is primarily used for retrieving one frame of a moving image as a still image.

The imaging apparatus also includes a position lock tab 206, a start/stop button 208, an unlock tab (unlock member) 209, a mode dial base 210, an LCD unit 211, a four-way switch 212, an OK button 213, and a CANCEL button 214. The position lock tab 206 fixes the position of the mode dial 207 so that the position of the mode dial 207 does not unexpectedly move. The start/stop button 208 starts and stops image recording. The unlock tab (unlock member) 209 releases the lock of the mode dial 207. The LCD unit 211 is used to check an image on a large screen. The four-way switch 212 provides easy operation to users. The OK button 213 is used to confirm the selection.

FIG. 1 is a functional block diagram of the imaging apparatus shown in FIG. 2. Other components not directly related to this embodiment are not shown in FIG. 1. For example, although an aperture, a shutter, and a focusing system are not shown, the imaging apparatus includes these components in practice.

An image capturing unit 101 includes a lens unit 203, in which a focus lens and a focus lens driving motor are integrated, and an imaging device for generating a camera signal from optical information output from the lens unit 203. An encoding unit 102 encodes a moving image signal received by the image capturing unit 101 based on a known highly efficient encoding method so as to create coded data. A recording and playback unit 103 records the coded data output from the encoding unit 102 on a recording medium 104, and also plays back the coded data recorded on the recording medium 104 to output to a decoding unit 105. For example, a disk medium, such as an optical disk, is used as the recording medium 104 in this embodiment.

The decoding unit 105 decodes the coded data played back by the recording and playback unit 103 into the original moving image data and outputs it to a second image display control unit 109.

A GUI information storing unit 106 stores GUI display data and extended information thereof. The GUI display data and extended information thereof are generated by an external device (not shown) in accordance with the type of a GUI image to be displayed by the imaging apparatus shown in FIG. 1, and are written to the GUI information storing unit 106. Additionally, the GUI information storing unit 106 stores a plurality of GUI image data items in association with extended information items thereof. A system control unit 112 determines a GUI image to be displayed in accordance with the operation of an operation unit 113.

Upon receiving a GUI display instruction from the system control unit 112, a first image display control unit 107 reads out the specified GUI display data from the GUI information storing unit 106. Then, the first image display control unit 107 renders a graphic element on the first image layer for GUI display and transmits the display position of the graphic element and identification information of the GUI display data to a partial area control unit 108.

Upon receiving a GUI display instruction from the system control unit 112, the partial area control unit 108 reads out GUI display data extended information corresponding to the identification information from the GUI information storing unit 106 based on the identification information received from the first image display control unit 107. The partial area control unit 108 then creates a control command for controlling the second image display control unit 109 based on the display position of the graphic element and the GUI display data extended information received from the first image display control unit 107, and transmits the control command to the second image display control unit 109.

Additionally, the partial area control unit 108 holds the GUI display data identification information corresponding to the control command transmitted to the second image display control unit 109, the display position of the graphic element, and the type of the control command in an identification information table so as to prevent retransmission of the control command.

The second image display control unit 109 renders an image signal decoded by the decoding unit 105 or an image for an image signal output from the image capturing unit 101 on the second image layer. The second image display control unit 109 also carries out partial image processing on an image on the second image layer.

A combining unit 110 combines the first image layer and the second image layer to generate display data, and transmits the display data to a display unit 111. At that time, by referencing a partial transparency attribute set for the first image layer, the combining unit 110 can generate display data as if an image on the second image layer was overlapped by an image on the first image layer.

The display unit 111 displays the display data received from the combining unit 110 on the LCD unit 211. The system control unit 112 controls the operation of each component in the apparatus in response to the instruction of the operation unit 113. In particular, when displaying a GUI image, the system control unit 112 outputs the GUI image to be displayed, the position of the GUI image, and the instruction to display the GUI to the first image display control unit 107, the partial area control unit 108, and the second image display control unit 109. The operation unit 113 includes various types of switches and buttons shown in FIG. 2.

An example of the display data extended information used in this embodiment and a display screen using the display data extended information are described next.

Figure 3:
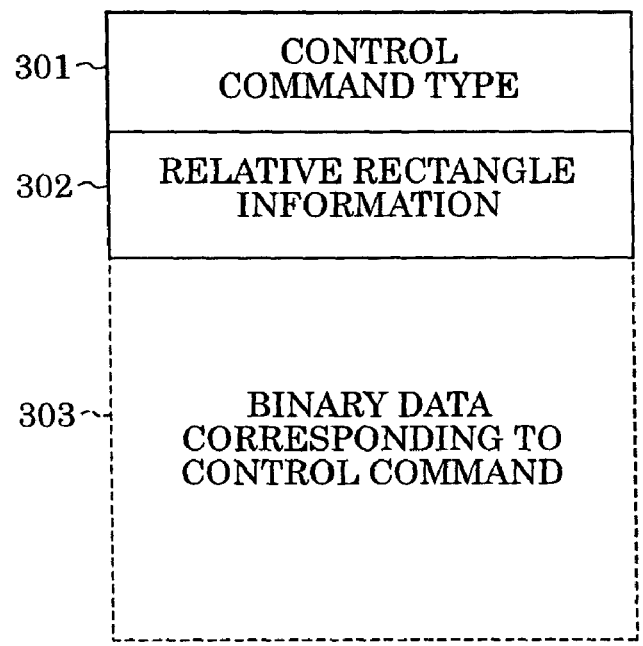
FIG. 3 illustrates the structure of extended GUI display data.

FIG. 3 illustrates the structure of the display data extended information stored in the GUI information storing unit 106.

The display data extended information includes a control command type 301, relative rectangle information 302, and binary data 303 corresponding to a control command.

Figure 4A:
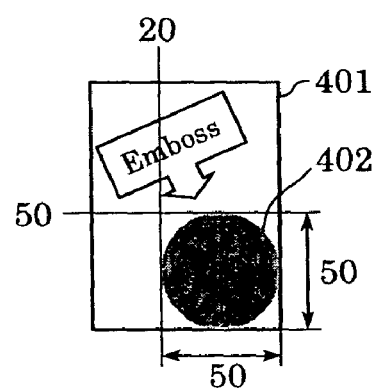
FIGS. 4A and 4B illustrate an example of extended GUI display data.
Figure 4B:
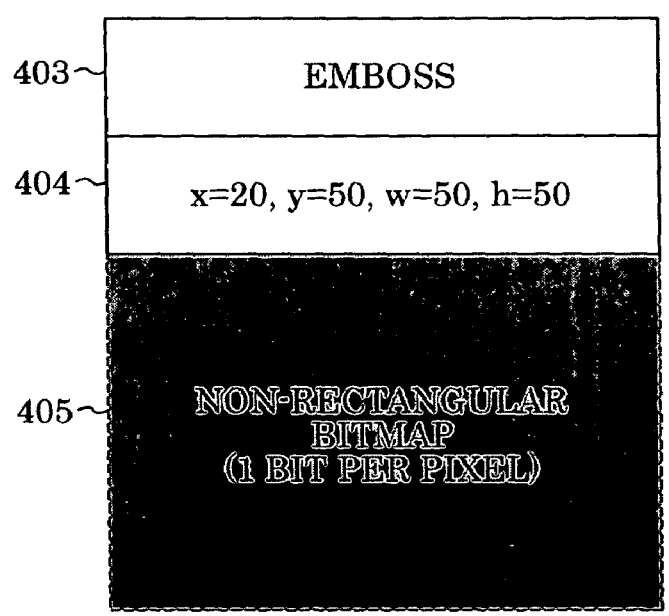

FIGS. 4A and 4B illustrate a specific example of the display data extended information. In FIG. 4A, an area 401 of a predetermined size is a target image area processed with the extended information. In this example, the extended information is used for adding the image effect "emboss" to a non-rectangular partial area 402 in the area 401.

Each item of the extended information is described next with reference to FIG. 4B. In this example, the control command type 403 indicates "emboss". In FIG. 4B, relative rectangle information 404 indicates that the x-y coordinate of the upper left corner of a rectangular frame which surrounds a partial non-rectangular image in the GUI target area 401 is (20, 50), the width of the frame is 50, and the height of the frame is 50. Binary data 405 is a non-rectangular bitmap having a ratio of 1 bit per pixel in the relative rectangle information 404.

Figure 5A:
FIGS. 5A, 5B, and 5C illustrate screen display examples using the extended GUI display data.
Figure 5B:
Figure 5C:
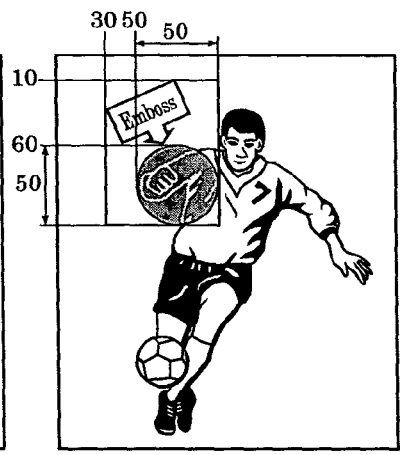

For example, when an image shown in FIG. 5A is displayed on the second image layer and when the bitmap shown in FIG. 4A is displayed at the x-y coordinate position (30, 10) on the first image layer, an image effect "emboss" is applied to the non-rectangular area of the image, shown in FIG. 5A, indicated by the binary bitmap 405 in a rectangle whose upper left corner is located at an x-y coordinate (50, 60) and whose width and height are both 50, as shown in FIG. 5B. The combining unit 110 combines the first image layer displaying the GUI image and the second image layer, resulting in the display shown in FIG. 5C.

Figure 6:
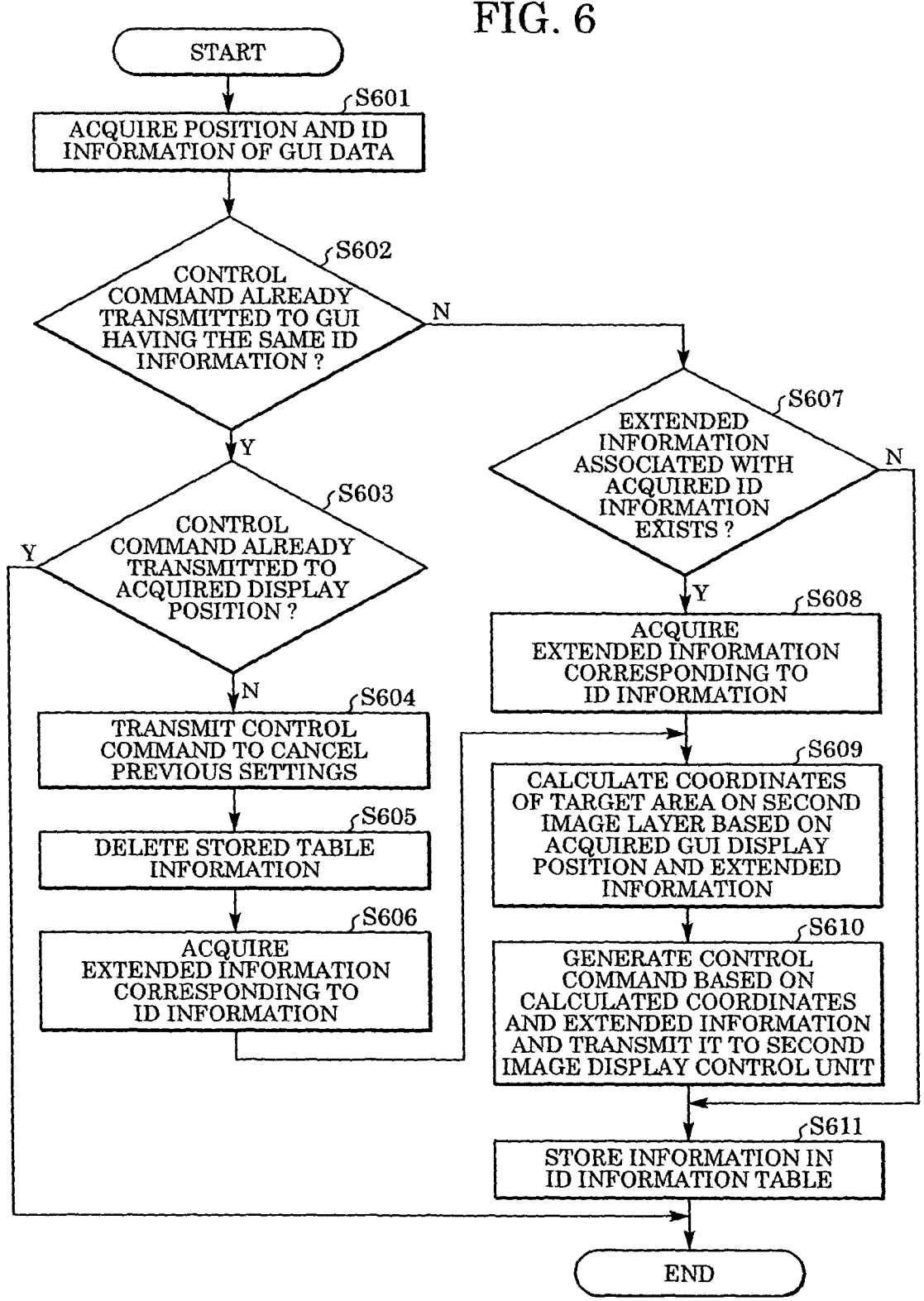
FIG. 6 is a flow chart of a process of partial area control means.

The displaying process of a GUI image using such extended information is described next with reference to FIG. 6.

Upon receiving an instruction to change a GUI display from the system control unit 112, the first image display control unit 107, as described above, reads out the specified GUI display data from the GUI information storing unit 106 to render a graphic element at the specified display position on the first image layer. The first image display control unit 107 then transmits the upper left corner position of the rendered graphic element and the GUI display data identification information to the partial area control unit 108. Thereafter, the first image display control unit 107 starts a process shown in FIG. 6.

The partial area control unit 108 acquires the position (x, y) of the upper left corner of the graphic element rendered based on the GUI display data and the GUI display data identification information transmitted from the first image display control unit 107 (step S601).

Subsequently, the partial area control unit 108 determines whether the partial area control unit 108 has already instructed the second image display control unit 109 to display a GUI having the same identification number by referencing the identification information table (step S602).

If the partial area control unit 108 has already instructed the second image display control unit 109 to display a GUI having the same identification number (yes in step S602), the partial area control unit 108 compares the acquired display position information with the entry in the identification information table to determine whether the partial area control unit 108 already transmitted a display command corresponding to the display position of the graphic element to the second image display control unit 109 (step S603).

If the partial area control unit 108 has not yet transmitted a display command corresponding to the same display position (no in step S603), the partial area control unit 108 generates a control command to cancel the image effect currently carried out by the second image display control unit 109 and transmits the generated command (step S604). The partial area control unit 108 then deletes the information on the GUI display data stored in the identification information table (step S605). Subsequently, the partial area control unit 108 acquires extended information corresponding to the identification information acquired at step S601 from the GUI information storing unit 106 (step S606). Processing then proceeds to step S609.

However, if the partial area control unit 108 has not already instructed the second image display control unit 109 to display a GUI having the same identification number (no at step S602), the partial area control unit 108 determines whether extended information corresponding to the acquired data identification information of the GUI display is stored in the GUI information storing unit 106 (step S607). If extended information corresponding to the acquired data identification information of the GUI display is stored in the GUI information storing unit 106 (yes in step S607), the partial area control unit 108 acquires the extended information of the GUI display data corresponding to the identification information from the GUI information storing unit 106 (step S608).

Upon acquiring the extended information of the GUI display data at step S606 or S608, the partial area control unit 108 calculates the coordinates of the target area of the image effect to be applied to the second image layer based on the display position information of the GUI graphic element acquired at step S601 and the relative rectangle information 302 contained in the extended information (step S609). Then, the partial area control unit 108 generates a control command based on the calculated coordinates and binary data contained in the extended information to output the control command to the second image display control unit 109 (step S610).

Subsequently, the partial area control unit 108 stores the identification information of the GUI display data and the position of the graphic element submitted with the control command and the control command itself submitted to the second image display control unit 109 in the identification information table (step S611). The series of processes is then completed.

Additionally, if, at step S603, the partial area control unit 108 has already transmitted the display command corresponding to the same display position of the graphic element as that of the currently displayed GUI (yes at step S603), the process is immediately completed.

Additionally, if, at step S607, the extended information corresponding to the acquired identification information of GUI display data is not stored (no at step S607), the partial area control unit 108 immediately stores the identification information of GUI display data and the information on the display position of the graphic element in the identification information table.

The above-described process allows an image processing corresponding to the extended information associated with the GUI display data to be carried out with respect to the partial area on the second image layer. Furthermore, the position of a graphic element represented by the GUI display data is checked. If the position is changed, the previously submitted command can be canceled and a control command corresponding to the new position can be submitted. Accordingly, even when the position of the graphic element is changed, the consistency between the GUI displayed on the first image layer and the position-changed partial area on the second image layer can be maintained.

Second Embodiment

A second embodiment of the present invention is described next.

The external view (FIG. 2) and block diagram (FIG. 1) of the second embodiment are identical to those of the first embodiment; therefore descriptions are not repeated here. FIGS. 7A to 7E show screen display examples when the focus moves from one graphic element to the other of a GUI rendered by the first image display control unit 107.

Figure 7A:
FIGS. 7A to 7E illustrate screen display examples using the extended GUI display data.
Figure 7B:
Figure 7C:
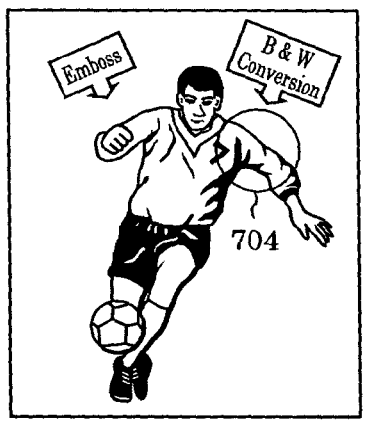

FIG. 7A shows a screen in which no focus mark is displayed. In the screen, two GUIs 701 and 702 are displayed. At that time, depressing the left portion of the four-way switch 212 changes the screen to a screen shown in FIG. 7B, in which a focus mark 703 appears. Similarly, depressing the right portion of the four-way switch 212 changes the screen to a screen shown in FIG. 7C, in which a focus mark 704 appears. By alternately depressing the left and right portions of the four-way switch 212, the focus marks 703 and 704 alternately appear.

Figure 7D:
Figure 7E:
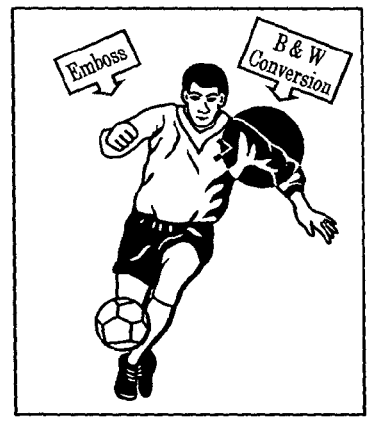

The display control procedure based on the extended information associated with GUI data for an in-focus bitmap is described next. In this display example, when a focus mark is on the left side (703), the "emboss" image effect is applied to the inside of the focus mark, as shown in FIG. 7D. When a focus mark is on the right side (704), the "black and white conversion" image effect is applied to the inside of the focus mark, as shown in FIG. 7E.

Figure 8:
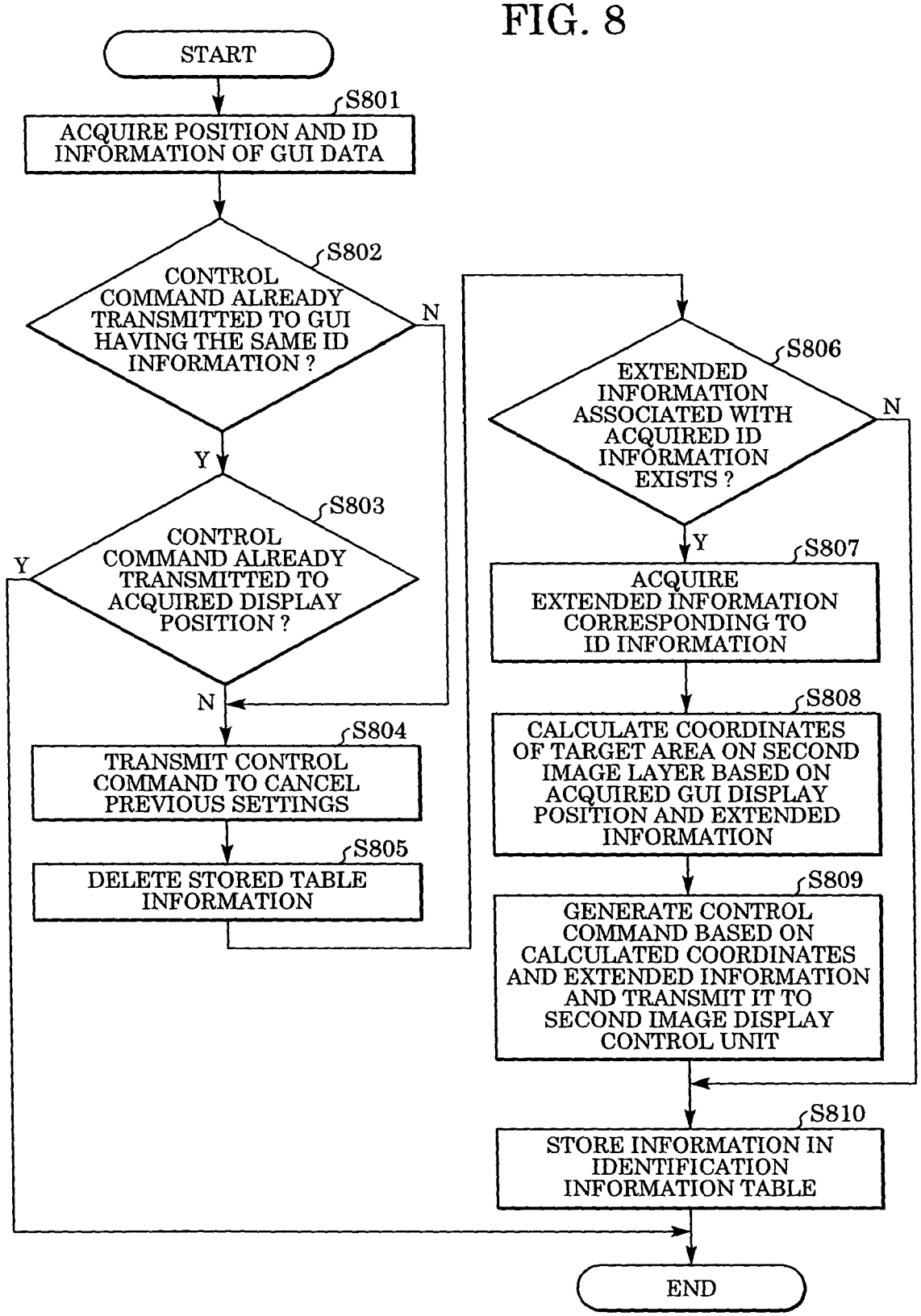
FIG. 8 is a flow chart of a display update process using the extended GUI display data when moving a focus.

The process flow is described with reference to a flow chart in FIG. 8. In this embodiment, the extended information of GUI display data and the bitmap structure are identical to those in FIGS. 3 and 4.

When the position of a focus mark is changed and a new focus mark is generated or when a focus mark moves, upon receipt of an instruction to change the GUI display from the system control unit 112, the first image display control unit 107 reads out the specified GUI display data from the GUI information storing unit 106 and renders a graphic element at the specified position on the first image layer, as described above. The first image display control unit 107 then transmits the upper left corner position of the rendered graphic element and identification information of the GUI display data to the partial area control unit 108, and starts the processing shown in FIG. 8.

The partial area control unit 108 first acquires the display position (x, y) of the in-focus graphic element and the identification information of GUI display data from the first image display control unit 107 (step S801).

The partial area control unit 108 then refers to the identification information table to determine whether the partial area control unit 108 has already instructed the second image display control unit 109 to carry out a display process using a GUI having the same identification number (step S802).

If the partial area control unit 108 has already instructed the second image display control unit 109 to carry out a display process using a GUI having the same identification number (yes in step S802), the partial area control unit 108 compares the acquired display position information with the entry in the identification information table to determine whether the partial area control unit 108 has already transmitted a display command corresponding to the display position of the graphic element to the second image display control unit 109 (step S803).

If, at step S802, the partial area control unit 108 has not yet instructed the second image display control unit 109 to carry out a display process using a GUI having the same identification number (no in step S802) or if, at step S803, the partial area control unit 108 does not yet transmitted a display command corresponding to the same display position of the graphic element (no at step S803), the partial area control unit 108 generates a control command to cancel the currently processed image effect by the second image display control unit 109 and transmits it to the second image display control unit 109 (step S804). Thereafter, the partial area control unit 108 deletes the information associated with the GUI display data stored in the identification information table (step S805).

Subsequently, the partial area control unit 108 determines whether the extended information corresponding to the identification information of GUI display data acquired at step S801 is stored in the GUI information storing unit 106 (step S806). If not stored (no at step S806), processing proceeds to step S810 (described below). If stored (yes at step S806), the partial area control unit 108 acquires the extended information corresponding to the identification information from the GUI information storing unit 106 (step S807).

Upon acquiring the extended information of the GUI display data, the partial area control unit 108 calculates the coordinates of the target area of the image effect to be applied to the second image layer based on the display position information of the GUI graphic element acquired at step S801 and the relative rectangle information 302 contained in the extended information (step S808). Then, the partial area control unit 108 generates a control command based on the calculated coordinates and binary data contained in the extended information to output the control command to the second image display control unit 109 (step S809). Processing then proceeds to step S810.

At step S810, the partial area control unit 108 stores the identification information of the GUI display data and the position of the graphic element submitted with the control command and the control command itself submitted to the second image display control unit 109 in the identification information table. The series of processes is then completed.

However, if, at step S803, the partial area control unit 108 already transmits the display command corresponding to the same display position of the graphic element as that of the currently displayed GUI, the process is immediately completed.

The above-described process allows an image process corresponding to the extended information associated with the in-focus graphic element to be carried out with respect to the partial area on the second image layer. Furthermore, as in the first embodiment, the position of a graphic element represented by the GUI display data is checked. If the position is changed, the previously submitted command can be canceled and a control command corresponding to the new position can be submitted. Accordingly, even when the position of the graphic element is dynamically changed, the consistency between the GUI displayed on the first image layer and the position-changed partial area on the second image layer can be maintained.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-143810 filed May 13, 2004, which is hereby incorporated by reference herein.

What is claimed is:

1. An image processing apparatus comprising:
   a storage unit configured to store image data showing a type of an image effect and additional information of the image data including control information indicating the type of the image effect shown by the image data and position information indicating an area where the image effect is added;
   a generation unit configured to generate first image data showing a name of the type of the image effect using the image data stored in the storage unit;
   an obtaining unit configured to obtain second image data;
   an image processing unit configured to add an image effect of the type shown by the first image data generated by the generation unit to the second image data in accordance with a display position of the first image data and the additional information stored in the storage unit, the image processing unit determining a part of the second image data to which the image effect is added in accordance with the display position of the first image data and the position information and adding the image effect of the type shown by the first image data to the determined part of the second image data in accordance with the control information; and
   a combining unit configured to combine the first image data generated by the generation unit and the second image data to which the image effect is added and to generate image data for displaying.

2. The image processing apparatus according to claim 1, wherein the position information indicates a relative position of the area to which the image effect is added with respect to the display position of the first image data.

3. The image processing apparatus according to claim 1, wherein the storage unit stores a plurality of image data and additional information corresponding to different types of the image effects, the generation unit generates a plurality of first image data indicating different names of types of the image effects using the plurality of image data, and the combining unit combines the plurality of first image data and the second image data.

4. The image processing apparatus according to claim 3, wherein in accordance with the additional information corresponding to selected one of the plurality of first image data displayed in the image data generated by the combining unit, the image processing unit adds the image effect of the type shown by the selected first image data to the second image data.

5. The image processing apparatus according to claim 1, further comprising:
   a display unit configured to display the image data generated by the combining unit.

6. An image processing method comprising:
   storing in a storage unit image data showing a type of an image effect and additional information of the image data including control information indicating the type of the image effect shown by the image data and position information indicating an area where the image effect is added;
   generating first image data showing a name of the type of the image effect using the image data stored in the storage unit;
   obtaining second image data;
   adding an image effect of the type shown by the first image data to the second image data in accordance with a display position of the first image data and the additional information stored in the storage unit, wherein the adding comprises determining a part of the second image data to which the image effect is added in accordance with the display position of the first image data and the position information and adding the image effect of the type shown by the first image data to the determined part of the second image data in accordance with the control information; and
   combining the first image data and the second image data to which the image effect is added and generating image data for displaying.

* * * * *